US008195799B1

(12) United States Patent
Anderson et al.

(10) Patent No.: US 8,195,799 B1
(45) Date of Patent: Jun. 5, 2012

(54) SMART TEST ARTICLE OPTIMIZER

(75) Inventors: Erik Ossian Anderson, Tumwater, WA (US); Wade Andrew Pfeiffer, Mercer Island, WA (US)

(73) Assignee: SHTC Holdings LLC, Montesano, WA (US)

( * ) Notice: Subject to any disclaimer, the term of this patent is extended or adjusted under 35 U.S.C. 154(b) by 0 days.

(21) Appl. No.: 13/281,632

(22) Filed: Oct. 26, 2011

(51) Int. Cl.
*G06F 15/173* (2006.01)

(52) U.S. Cl. ........ 709/224; 709/203; 709/217; 709/218; 709/223; 709/230; 709/231

(58) Field of Classification Search .................. 709/203, 709/217, 218, 213, 223, 224, 230, 231
See application file for complete search history.

(56) References Cited

U.S. PATENT DOCUMENTS

| | | | |
|---|---|---|---|
| 6,981,040 B1* | 12/2005 | Konig et al. .................. 709/224 |
| 7,542,918 B2 | 6/2009 | Phillips | |
| 7,698,270 B2 | 4/2010 | Brave et al. | |
| 2003/0009373 A1 | 1/2003 | Ensing et al. | |
| 2003/0144907 A1 | 7/2003 | Cohen, Jr. et al. | |
| 2005/0039206 A1 | 2/2005 | Opdycke | |
| 2006/0136589 A1* | 6/2006 | Konig et al. .................. 709/224 |
| 2007/0016433 A1 | 1/2007 | Leakey et al. | |
| 2007/0244987 A1* | 10/2007 | Pedersen et al. .............. 709/217 |
| 2008/0004940 A1 | 1/2008 | Phillips | |
| 2008/0059721 A1 | 3/2008 | Turner et al. | |
| 2008/0091517 A1* | 4/2008 | Koonce et al. .................. 705/10 |
| 2008/0256052 A1 | 10/2008 | Kar et al. | |
| 2009/0158179 A1 | 6/2009 | Brooks | |
| 2010/0268731 A1 | 10/2010 | Roytman et al. | |
| 2011/0040636 A1 | 2/2011 | Simmons et al. | |
| 2011/0106729 A1 | 5/2011 | Billingsley et al. | |
| 2011/0173056 A1 | 7/2011 | D'Alesio et al. | |

FOREIGN PATENT DOCUMENTS

| WO | WO03003160 A2 | 1/2003 |
| WO | WO2006071931 A2 | 7/2006 |

\* cited by examiner

*Primary Examiner* — Liangche A Wang
(74) *Attorney, Agent, or Firm* — Steven C. Stewart (57) ABSTRACT

A method and apparatus to compare a control article against a test article to support a product or service is disclosed. A client indicates a selection of the test article to be compared with the control article. The articles are fed to multiple end users in response to requests from the end users. The requests or responses are tracked to determine whether the control article or test article has more negative or positive responses. The control article may then be replaced with the test article as a primary article to support the product or service if the test article has a predetermined amount of positive or negative responses when compared with the control article to increase efficiency in supporting the product or service.

20 Claims, 8 Drawing Sheets

SMART TEST ARTICLE OPTIMIZER

TECHNICAL FIELD

These claimed embodiments relate to a method for optimizing testing of a web based article and more particularly to optimizing content of a web based article in order to deflect more calls, emails, or messages away from a company's service call center.

BACKGROUND OF THE INVENTION

A method and apparatus for optimizing testing of a web based article to deflect communication away from a company's service call center is disclosed.

A knowledge base of articles is created by companies to support their products and services. These articles contain information about the company and its products and services to answer end user's questions. Companies typically make their knowledge base of articles available to an end user as well as customer service personnel in their call centers electronically using networks including intranets and their web site.

When an end user has a question regarding the company's product or service, the user may consult the companies manual provided with a product, may obtain information from a company's web site or may contact the company directly via e-mail, chat messaging or using telephone communication.

To handle this communication, the company must maintain a support staff. If the company is supporting a large base of end users, the support staff can become large and expensive. Further, the more communication the support staff handles, the more expensive it is for the company to support the product or service resulting in less company profits.

One way to reduce the support communication is to have quality product/service support articles posted on the company's web site. The ongoing goal of these articles is to lower support costs by deflecting calls by answering the end user's questions via a web page. The company can improve the deflection rate, by both adding new content and optimizing the existing content on the site. Optimizing content is a challenging process because the methods to identify opportunities and measure success are often manual, subjective, and time consuming. Companies look to knowledge base experts and other administrators to manually review and modify the articles based on their best practice experiences, analytical and reporting information as well as call center statistics.

A drawback of the current method of developing web based support articles is that because the process can be subjective, the best practice experiences are often hit or miss resulting in a potential increase in costs to companies in supporting their product or services. Another drawback is that inferior support articles can cause a time consuming and terrible end user experience by either requiring the end user to view multiple web pages and to sort through multiple articles or to give up in frustration. This bad end user experience may frustrate the end user and result in the end user no longer using the company's product or services or encourage them to call the call center and complain which ties up even more company resources.

SUMMARY OF THE INVENTION

In one implementation a method is disclosed that supports a product or service with a computing device. The method includes receiving an article selection from a client indicating a selection of a control article and a test article stored in the memory of the computing device. The control article and the test article provide information via the network to support a product or service with the computing device. The computing device receives, via the network, article requests from multiple end users. In response to a first request of the article from a first end user of the multiple end users, the computing device feeds the control article via the network to the first end user, and in response to a second of the article requests from a second end user of the multiple end users, the computing device feeds the test article via the network to the second end user. The computing device receives one or more additional requests from the first end user resulting from the first end user being fed the control article, and receives one or more additional requests from the second end user (or additional end users) resulting from the second end user (or additional end users) being fed the test article. The computing device tracks the requests from or responses fed to the first end users, and the computing device tracks the requests from or responses fed to the second end users. The computing device establishes a rating for each of the requests or responses and determines whether the control article or test article has more negative or positive responses. If the test article has more positive or fewer negative responses, the computing device can be set up to replace the control article with the test article to increase efficiency in supporting the product or service.

In another implementation, a system is disclosed including a computing device coupled with a network for supporting a product or a service, the computing device includes a memory storing a control article and one or more test articles. The control article and the test articles are instantiated as web pages to support the product or the service. The control article is the primary article to support the product or the service. The computer includes a receiver that receives an article selection from a client indicating a selection of a control article and a test article and includes a transmitter to feed the control article and the test article to multiple end users. The control article and the test article are provided to the multiple end users via the network to support a product or service with the computing device. The receiver receives via the network article requests from multiple end users. The transmitter, in response to a first of the article request from a first user of the multiple end users, feed the control article via the network to the first user. The transmitter, in response to a second of the article requests from a second user of the multiple end users, feeds the test article via the network to the second user. The receiver receives one or more additional requests from the first user resulting from the first user being fed with the transmitter the control article, and receives one or more additional requests from the second user resulting from the second user being fed with the transmitter the test article. The computing device includes a tracking module to track the requests from or responses fed to the first end users, and to track the requests from or responses fed to the second end users. The computing device also includes a control module to establish a rating for each of the requests or responses. The control module in response to the tracking of the requests or responses and in response to establishing a rating for each of these requests or responses, provides an indication of whether the control article or test article has more negative or positive responses. The control module replaces the control article with the test article as the primary article to support the product or service if the test article has more positive or fewer negative responses to increase efficiency in supporting the product or service with the computing device via the network.

In addition, a computer readable storage medium comprising instructions is disclosed. The instructions when executed by a processor cause the computing device to: a) receive an article selection from a client indicating a selection of a control article and a test article stored in a memory of the computing device, the control article and the test article provide information via the network to support a product or service with the computing device, b) receive via the network article requests from multiple end users, c) in response to a first of the article request from a first user of the multiple end users, feed the control article via the network to the first user, and in response to a second of the article requests from a second user of the multiple end users, feed the test article via the network to the second user, d) receive one or more additional requests from the first user resulting from the first user being fed the control article, e) receive one or more additional requests from the second user resulting from the second user being fed the test article, f) track the requests from or responses fed to the first end users and the second end users, g) establish a rating for each of the requests or responses, h) in response to the tracking of the requests or responses and in response to establishing a rating for each of these requests or responses, provide an indication of whether the control article or test article has more negative or positive responses, and i) replace the control article with the test article if the test article has more positive or fewer negative responses to increase efficiency in supporting the product or service with the computing device via the network.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
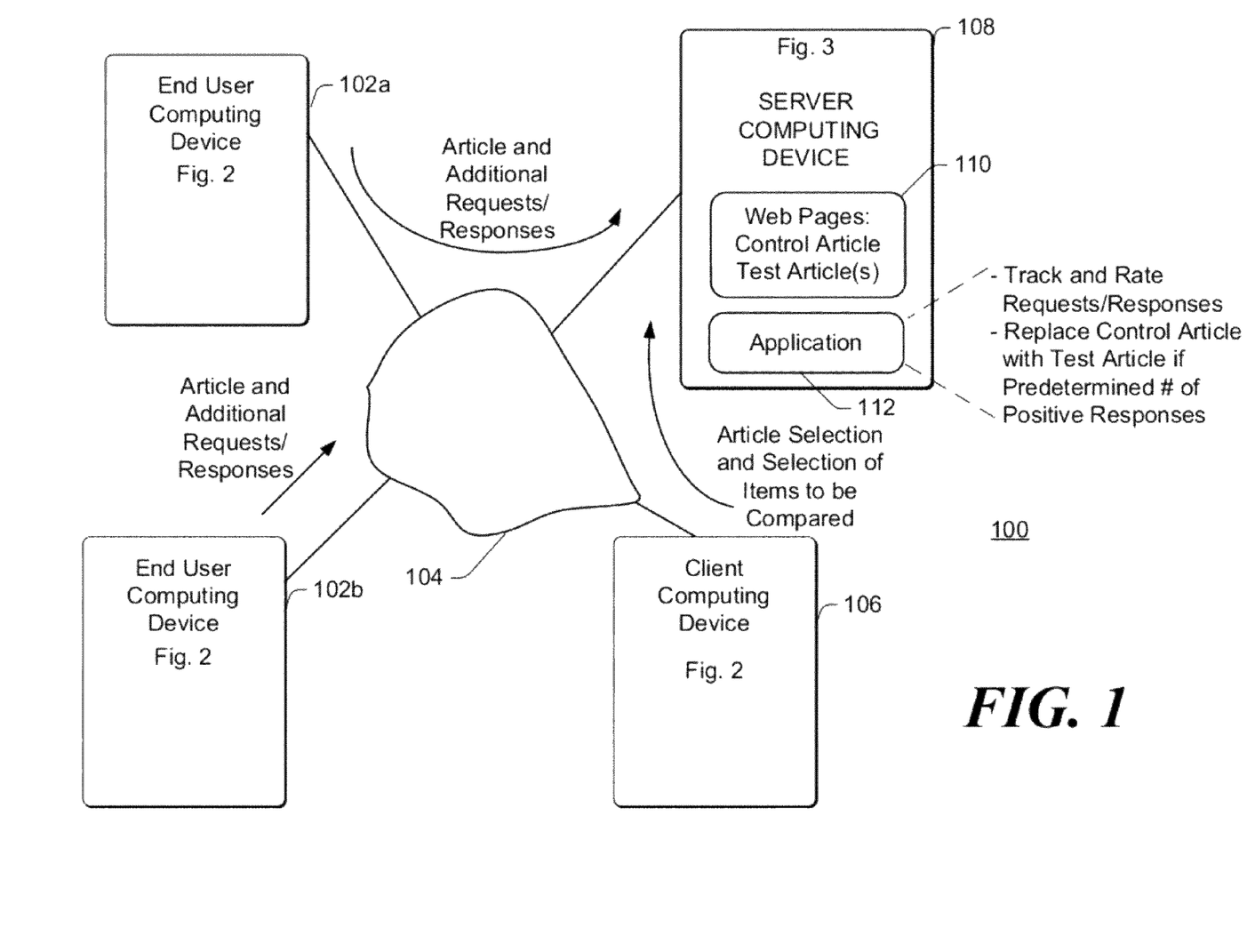
FIG. 1 is a simplified schematic diagram of a system for optimizing testing of a web based article.

Referring to FIG. 1 there is shown a system for optimizing testing of a web based article 100 including end user computing devices (also referred to herein as a "personal computing device") 102a-102b coupled via a network 104 to client computing device 106 and to one or more network server devices 108. Server computing device 108 is described communicating directly with computing devices 102a-102b and client computing device 106; however, such communication is for illustration purposes only and in a typical implementation server computing device 108 communicates via network 104 to end user computing devices 102(*a-b*), other end user computing devices (not shown) and client computing device 106.

Server computing device 108 may be a network computer, host computer, network server, web server, email server or any computing device for hosting email communications applications and systems, one example of which includes a Microsoft® exchange server. Although end user computing devices 102 and client computing device are described as a personal computing device, devices 102 and client computing device 106 may be any type of computing device such as a cell phone, laptop, mobile computer, desktop computer, personal computer, PDA, music player or game player device.

In one implementation, server computing device 108 includes one or more processors (not shown) and computer memory containing Control articles and test articles manifested as web pages 110. Control and Test articles, in one implementation, may be defined as page of information necessary to operate, provide support for, or use a product. Server computing device 108 includes a software application 112 which when executed by the processors, allow selection of a test article to be tested against a control article, transmit the control article and the selected test article to the end user computing devices 102 via the network, track and rate requests and/or responses received from the end users via the network, and display the results of the responses (also referred to as the result of a test). Software application may also enable the replacement of the control article with the selected test article upon either the positive responses to the test article minus the positive responses to the control article exceeding a first predetermined number or the negative responses to the control article minus the negative responses to the test article exceeding a second predetermined number, or the first predetermined number plus the second predetermined exceeding a third predetermined number. Such predetermined numbers may be preset or set by a user of the client computing device 106.

Referring to FIG. 1, during operation the user of the client computing device 106 periodically using an I/O device provides an indication to client computing device 106 to feed a signal to server computing device 108. The signal provides a request to send client computing device 106 its control article and test article 110 stored in memory of server computing device 108. Client computing device 106 receives the articles, and the user of the client computing device 106 selects one of the test articles. Upon requests from the end user computing devices 102a-102, the server computing devices alternately or randomly (as described in more detail herein) sends control article and test articles to one or more end user computing devices 102a-102n. Although only two end user computer devices 102a-102n, are described, the server computing devices may send control and/or test articles any number of end user computing devices, or to any device on the internet, a company intranet or the World Wide Web.

The server computing device 108 receives article requests via network 104 from end user computing device 102a and end user computing device 102b. In one implementation when device 102a requests an article, it sends a unique identification code identifying that the request came from computing device 102a. Also when device 102b requests an article, it sends a unique identification code identifying that the request came from computing device 102b.

In another implementation computing device 108 responds to the request from device 102a by feeding the control article via network 104 to device 102a, and responds to the request from device 102b by feeding the selected test article via network 104 to the device 102b.

The end users of computing device 102a and computing device 102b (and additional computing devices (not shown)) respectively respond to their received articles by selecting one or more items of information in the article, resulting in computing devices 102a and 102b sending additional requests (along with indications of the selections and the identification of computing device 102a and 102b) to server computing device 108. Server computing 108 tracks the requests and various indications in the responses. In addition server computing device 108 assigns a rating to the selections in each of the responses. The ratings may be assigned to an individual selection of a portion of the article, a selection of the entire article or based on other parameters of the indicated selection that are described in more detail herein. In one implementation, the computing device 108 assigns either a positive, neutral or negative rating to the selections and responses with application 112.

Server computing device 108 compiles a listing of the positive, neutral and negative ratings. Server computing device 108 associates these ratings with either the control article or test article depending on whether the selection or response originated from an end user responding to a test article or a control article. Although a control article is tested against a test article (a/b testing) is described in detail herein, the testing may involve comparing a control article to multiple test articles (multivariate testing) or comparing the selection of multiple items on the control article with the selection of multiple items on one or more test articles. In one implementation, after a predetermined period of time, that may be set by client computing device 106, the server computing device 108 or a client accessing information in server computing device 108 using client computing device 106 is provided a compilation of the rating to be analyzed.

The client user and/or the client computing device 106 makes a determination based on the ratings whether or not to replace the test article with the control article. In one implementation the control article is replaced with the test article if the test article received a predetermined number of (e.g. at least one more) positive ratings than the control article. In another implementation, the control article is replaced with the test article if the control article received a predetermined number of (e.g. at least one more) negative ratings than the test article. In a further implementation, the client article is replaced with the test article if the number of positive ratings minus the number of negative ratings for the test article, is at least one more than the number of positive ratings minus the number of negative ratings for the control article.

Although in this example the control article is replaced if at least one more negative/positive ratings are in the test article and/or control article, the predetermined number to used in determining whether to replace the control article with the test article may be any number that is set by a client user or any predetermined number loaded into the server computing device 108. In one implementation each of the negative, neutral or positive ratings are provided a weighting. The weightings for each positive and/or negative rating may then be combined to determine wither or not to replace the control article with the test article.

Example Personal Computing Device Architecture

Figure 2:
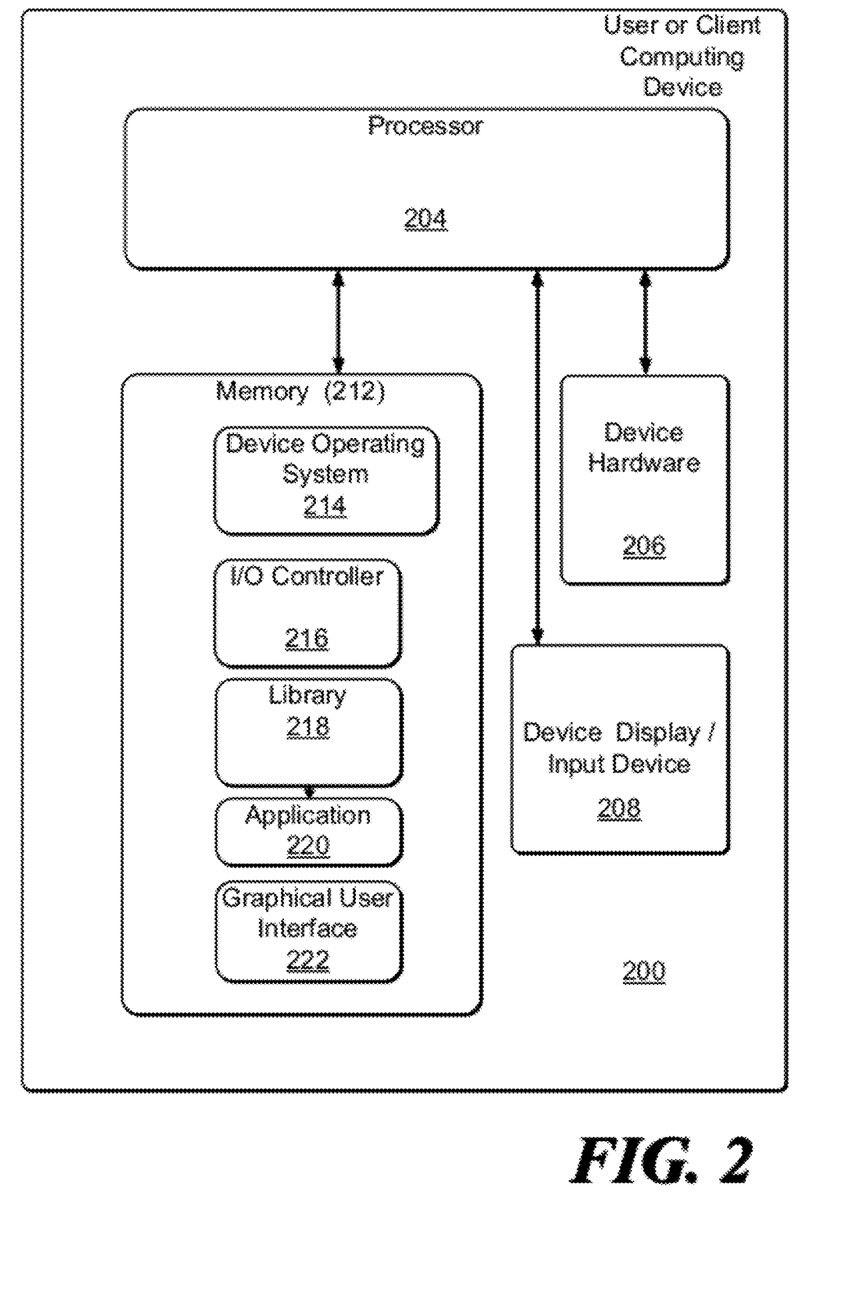
FIG. 2 is a simplified schematic diagram of an exemplary computing device used in the system for optimizing testing of a web based article.

In FIG. 2 there are illustrated selected modules in Personal Computing Device 200 (computing device 102a-b and 106 of FIG. 1). Personal computing device 200 includes a processing device 204, memory 212, hardware 206 and display/input device 208. Processing device 204 may include a microprocessor, microcontroller or any such device for accessing memory 212, hardware 206 and display/input device 208. Processing device 204 has processing capabilities and memory suitable to store and execute computer-executable instructions. In one example, Processor 204 includes one or more processors 204.

Processing device 204 executes instructions stored in memory 212, and in response thereto, processes signals from hardware 206 and display/input device 208. Hardware 206 may include network and communication circuitry for communicating with network 104 (FIG. 1). Display/Input device 208 receives inputs from a user of the personal computing device and may include a keyboard, mouse, track pad, microphone, audio input device, video input device, or touch screen display. Display device 208 may include an LED, LCD, CRT or any type of display device.

Memory 212 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium (including a non-transitory computer readable storage medium) which can be used to store the desired information and which can be accessed by a computer system.

Modules stored in memory 212 of the personal computing device 200 may include an operating system 214, an I/O controller 216, a library 218, a browser application 220 and a graphical user interface 222. Operating system 214 may be used by application 220 to operate device 200. I/O controller may provide drivers for device 200 to communicate with hardware 206 or device 208. Library 218 may include pre-configured parameters (or set by the user before or after initial operation) such as personal computing device operating parameters and configurations. Browser application, may include a generally known network browser (including, but not limited to, Internet Explorer, Netscape Firefox, Oracle, Chrome or Safari) for displaying articles manifested as web pages received from the network.

Example Architecture

Figure 3:
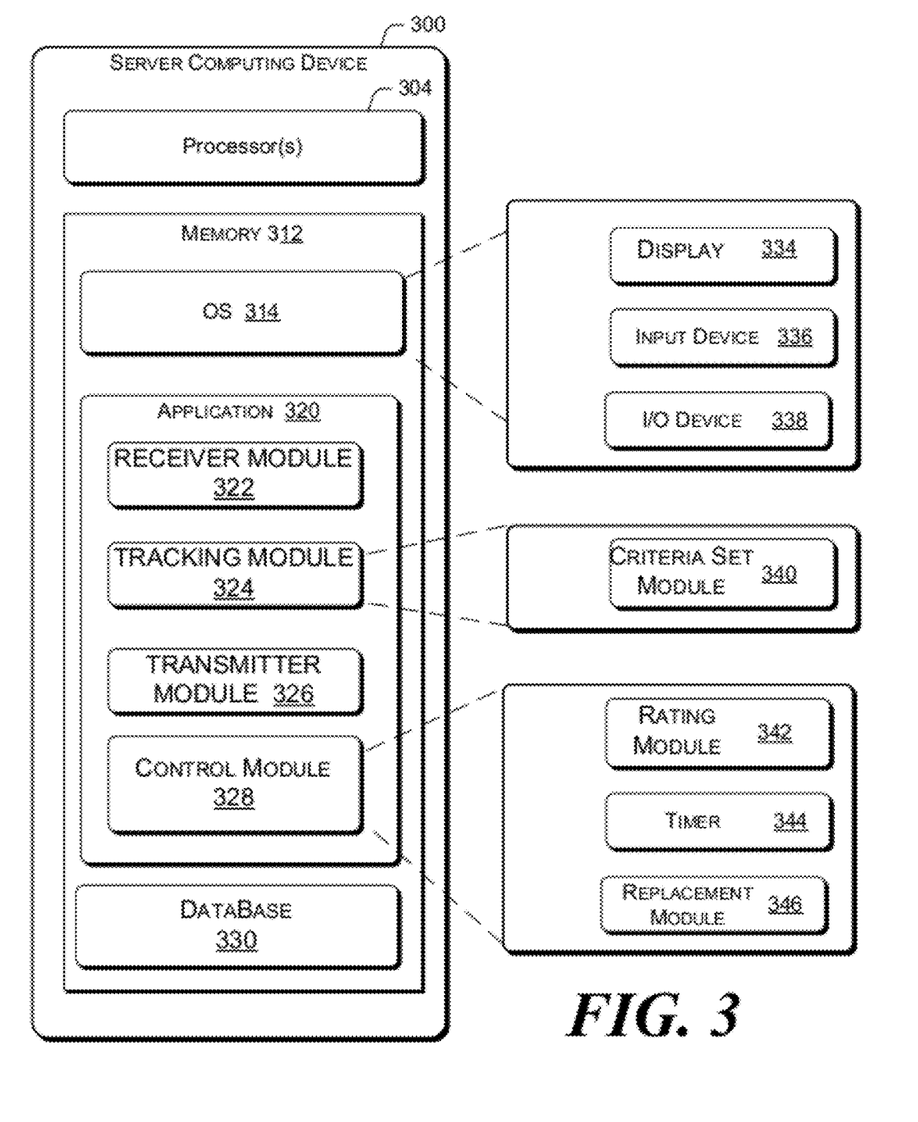
FIG. 3 is a simplified schematic diagram of an exemplary hosting computing device used in the system for optimizing testing of a web based article.
Figure 4:
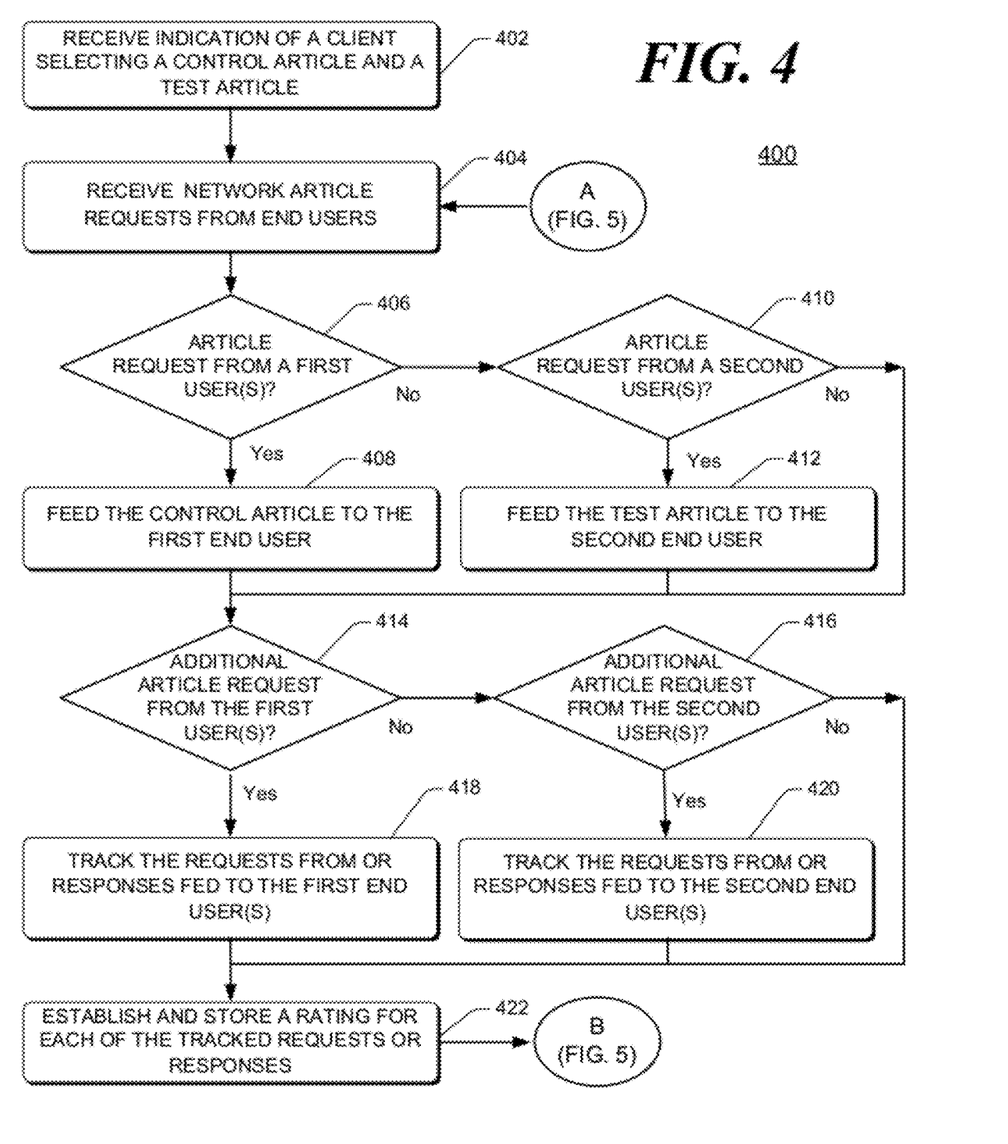
FIGS. 4 and 5 are a flow chart of a process for system for optimizing testing of a web based article using the exemplary hosting computing device shown in FIG. 3.
Figure 5:
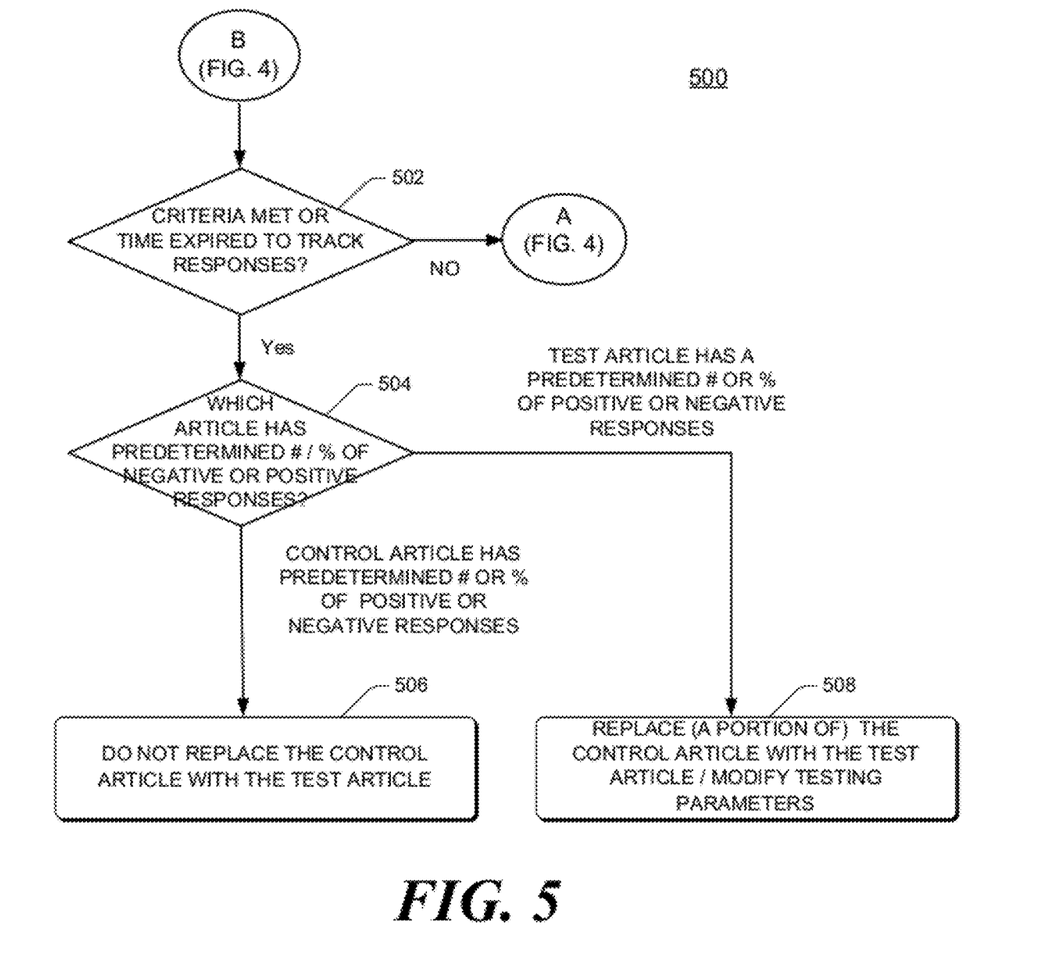

In FIG. 3 there are illustrated selected modules in host computing device 300 (Server Computing Device 108 of FIG. 1) using processes 400 and 500 shown in FIGS. 4 and 5. Hosting device 300 includes a processing device 304, memory 312, and hardware 314. Processing device 304 may include one or more a microprocessors, microcontrollers or any such devices for accessing memory 312 or hardware 314. Processing device 304 has processing capabilities and memory 312 suitable to store and execute computer-executable instructions.

Processing device 304 executes instruction stored in memory 312, and in response thereto, processes signals from hardware 314. Hardware 314 may include a display 334, and input device 336 and an I/O device 338. I/O device 338 may include a network and communication circuitry for communicating with network 104. Input device 336 receives inputs from a user of the host computing device 300 and may include a keyboard, mouse, track pad, microphone, audio input device, video input device, or touch screen display. Display device 334 may include an LED, LCD, CRT or any type of display device.

Memory 312 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 312 of the hosting device 300 may include an operating system 314, application 320 and a library of other applications such as a database 330. Operating system 314 may be used by application 320 to operate device 300. The operating system 314 may include drivers for device 300 to communicate with I/O device 336. Database 330 may include preconfigured parameters (or set by the user before or after initial operation) such web site operating parameters, web site libraries, HTML libraries, API's and configurations.

Stored in the database in memory 312 are the control article and one or more test articles. The control article and the test articles are embodied as web pages to support a product or service. The control Article is the primary article to support the product or the service, where the Test Article is a proposed replacement article for the primary article.

Application 320 includes a receiver module 322, a tracking module 324, a transmitter module 326 and a control module 328. Tracking module 324 includes criteria set module 340. In one implementation, control module 328 includes a rating module 342, a timer module 344 and a replacement module 346.

Receiver module 322 includes software instruction, that when executed by processor 304 receive via the network article requests from the multiple end users. In addition, instructions in receiver module 322 enable the reception of one or more additional requests from the first user resulting from the first user being fed with a transmitter module 326 the control article and receive one or more additional requests from the second user resulting from the second user being fed with the transmitter module 326 the test article.

Transmitter module 326 includes software instruction, that when executed by processor 304 feed the control article and the test article to multiple end users. In one implementation the control article and test article is transmitted to the user as one or more web pages from memory 312 of the computing device 300.

Instructions in transmitter module 326, in response to a first of the article request from a first user of the multiple end users, enables the feeding of the control article via the network to the first user, and in response to a second of the article requests from a second user of the multiple end users, enables the feeding of the test article via the network to the second user.

Tracking module 324 includes software instruction, that when executed by processor 304, tracks the requests from or responses fed to the first end users, and tracks the requests from or responses fed to the second end users. Tracking module 324, in one implementation, sets one of 1) a user count corresponding to a number of user requests or responses, 2) a sample size, or 3) a sampling rate.

Criteria Set module 340, within tracking module 324, includes software instruction, that when executed by processor 304 sets a criterion to stop tracking the requests and replace the control article with the test article. In one implementation, the criterion is selected from one of a predetermined user count, a predetermined sample size or a predetermined sampling rate.

Tracking module includes software instruction that when executed by processor 304, track requests from or responses fed to the second end users that includes tracking at least one of a time period a user selects a web page before selecting a different web page, a percentage or a number of users tracking scroll depth; a percentage or a number of users exiting or closing a web page, a percentage or a number of users exiting any web page provided to the user by the computing device; a percentage or a number of users requesting support personnel interaction via a case submit requests, chat request, emails request; phone call request or contact us request; a percentage or a number of users that enter information into a "search" for additional information field in the web page; what search terms users enter into the "search" for additional information field in the web page; a percentage or number of users that select other pages within a website provided by a legal entity; a percentage or a number of users that proceed to another support web page provided by the computing device; the support web page that is provided by the computing device; a percentage or a number of users that complete a survey or provide a comment response; a customer satisfaction indication; or a percentage or a number of users that select a call to action link on the web page.

Rating module 342, within Control module 328, includes software instruction that when executed by processor 304, establishes a rating for each of the requests or responses. The instructions within control module 328, in response to the tracking of the requests or responses and in response to rating module 342 establish a rating for each of these requests or responses. Control module 328 provides an indication of whether the control article has a predetermined number of negative or positive responses with respect to the test article. Replacement module 346 replaces the control article with the test article as the primary article to support the product or service if either the number of test article positive responses minus the control article positive responses is a first predetermined amount (or number), or if the number of test article negative responses minus the control article negative responses equals a second predetermined amount (or number) to increase efficiency in supporting the product or service with the computing device via the network.

The rating module, in one implementation may rate each of the requests or responses as a positive behavior, a neutral behavior or a negative behavior depending on a) whether the request or response is a member of a set of a negative behavior category requests or responses, b) whether the request or response is a member of a set of a neutral behavior category requests or responses, or c) whether the request or response is a member of a set of a positive behavior category responses.

In a further implementation, positive behavior category responses include at least one of the set of behavior category responses that include 1) the user exit or closing a web page, or 2) the user selecting a subsequent web page or entering information on an additional web page in according with the directions specified on the test article or control article via the one or more web pages.

In another implementation, the negative behavior category responses include at least one of the set of behavior category responses including: 1) the user selecting a submitting an additional support case document, 2) the user selecting a "contact us" link on the web page, 3) the user contacting a customer service line, or 4) the user providing a poor rating indication or a negative comment to the computing device.

In an additional implementation, the control module includes a timer module 344 with software instruction that when executed by processor 304, sets a start time and end time to track the requests and responses. The replacement module 346 may receive an indication from timer 344 and replace the control article with the test article if the test article has more positive or fewer negative responses to increase efficiency in supporting the product or service with the computing device via the network after the end time.

Illustrated in FIGS. 4 and 5, are processes 400 and 500 for optimizing testing of a web based article. The exemplary process in FIGS. 4 and 5 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIGS. 4 and 5, although it may be implemented in other system architectures.

Referring to FIGS. 4 and 5, a flowchart of process 400 and 500 performed by processor 304 when executing the software instructions in application 320 is shown. Process 400 includes blocks 402-422, and process 500 includes blocks 502-508. When application 320 is executed on the host processing device 300, it uses the processor 304 and instructions in modules 322-346 that are shown in FIG. 3.

Figure 6:
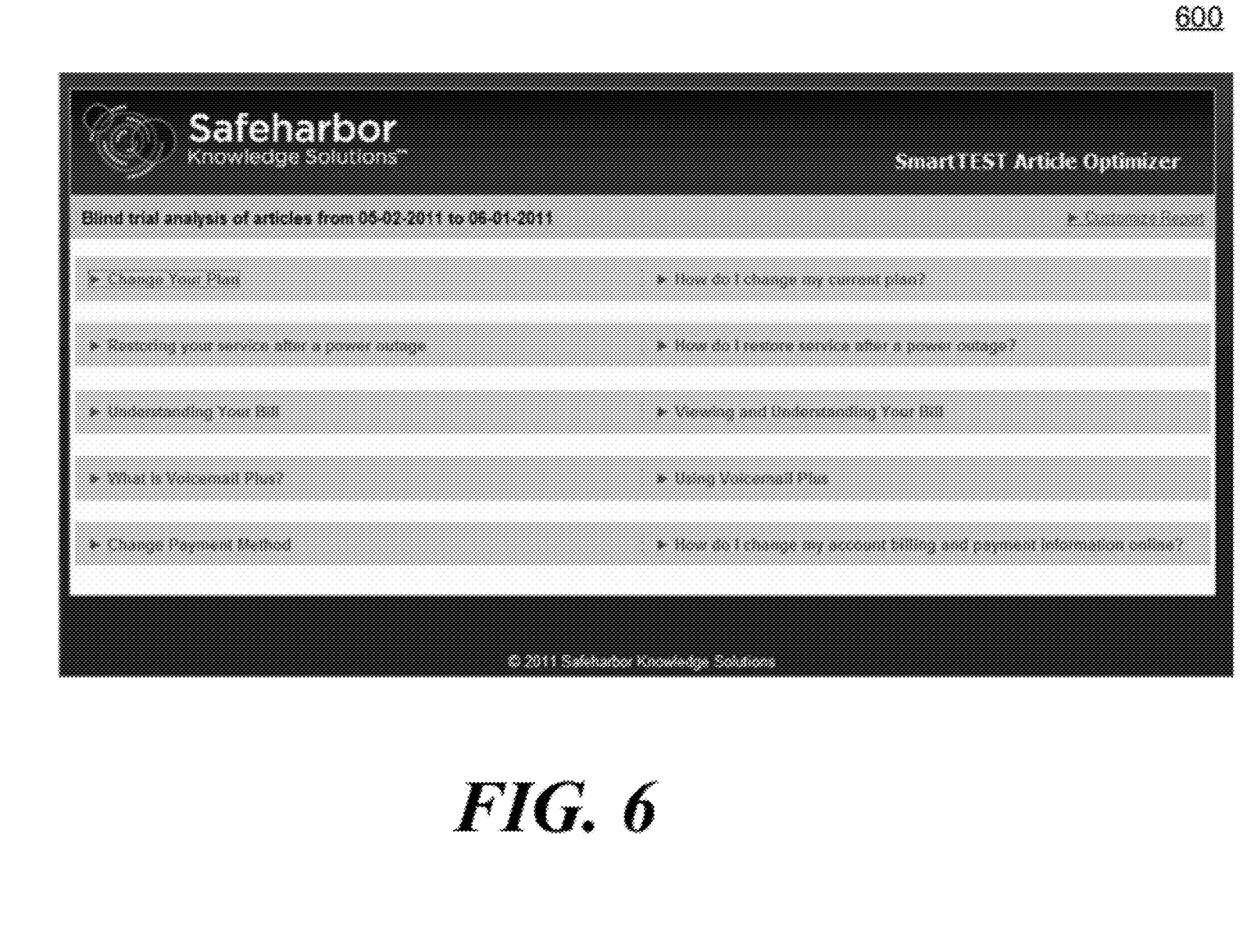
FIGS. 6-7 are exemplary displays generated with the system for optimizing testing of a web based article.
Figure 7:
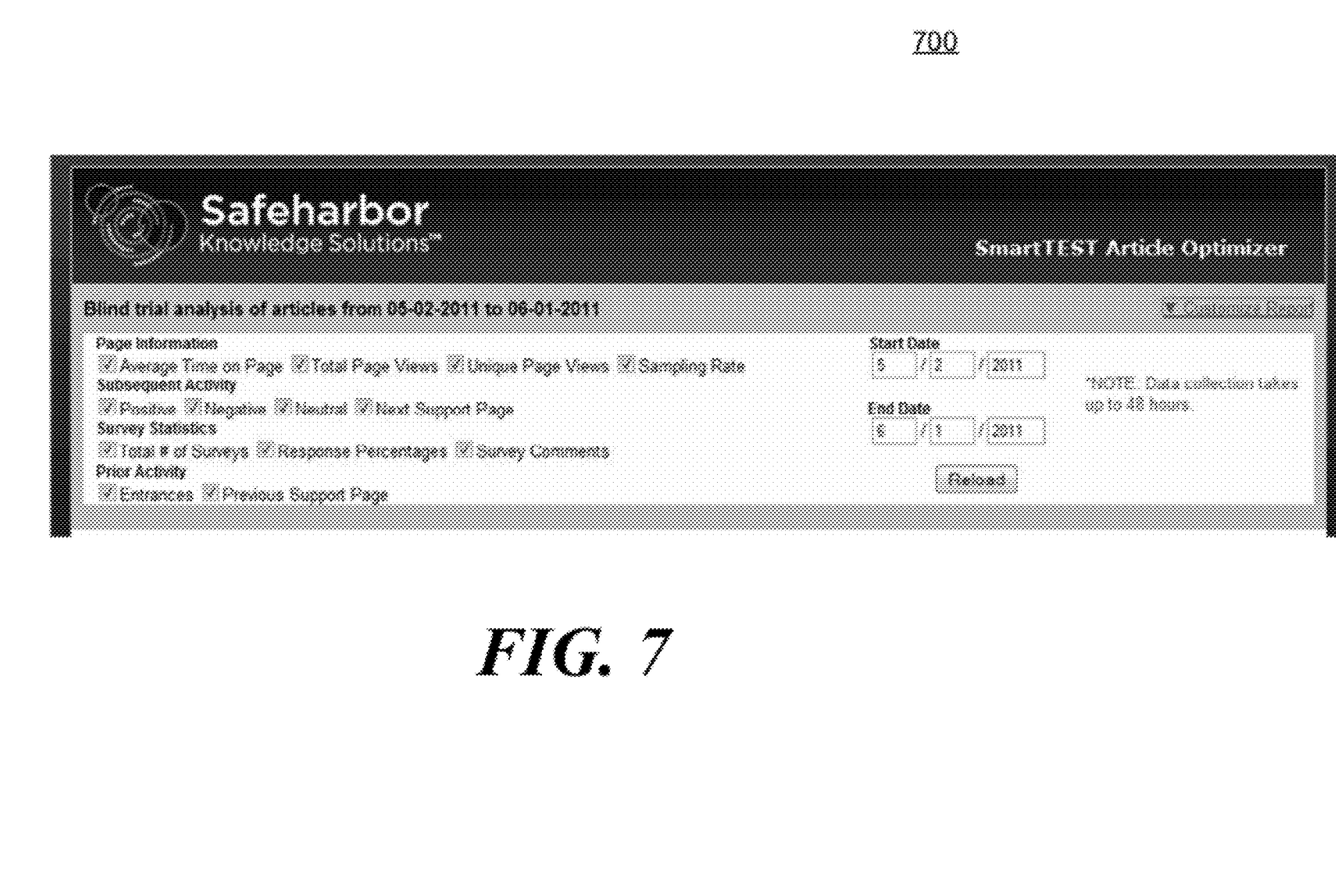

In the process 400, the server computing device 300 (FIG. 3) provides one or more control articles embedded in web pages to end user computing devices 102a-102b, and to client computing device 106 upon request from the end user computing devices 102a-102b and client computing device 106 via network 104. In addition upon a request from the client computing device 106, computing device 300 provides test selection indications 600 (FIG. 6), a list of articles to be tested 700 (FIG. 7) and one or more test articles pages from its database 330 to client computing device 106. These requests may be received as digital signals that include an identification code, a requested article identifiers, selection indications and web addresses.

In block 402, computing device 300 receives an indication of one or more test articles selected by a client using client computing device 106. The test articles stored may be stored in database 330. Upon selection of the test article by the client computing device, the test article will used by the server computing device 300.

In block 404, server computing device 300 receives via network 104 requests from computing devices 102 a-b for an article. Upon each request, the computing device 300 assigns the end user to either be a first end user or a second end user. Although only two end user computing devices (102a and 102b) are disclosed, the server computing device can receive requests from an infinite number of end user computing devices by assigning each computing device to be either a first end user computing device 102a or a second end user computing device 102b. Further whether the end user computer making the request is assigned to be the first or second end user computing device may be completely random, or may be based on a predetermined formula. The assignment of the computer being the first or second end user computing device may be stored in database 330 along with a received identification code of the computing device making the request.

In block 406, computing device 300 makes a determination of whether the first end user made the request by examining the identification code information provided in the request. If the request was from a first end user computing device 102a, the control article is fed to the first end user computing device 102a via the network 104 in block 408.

In block 410, computing device 300 makes a determination of whether the request was made from a second end user by examining the identification code information provided in the request. If the request was from a second end user computing device 102a, the selected test article is fed to the second end user computing device 102a via the network 104 in block 412. If the computing device was not from a first or second end user the process continues in block 414. In one implementation, an article may be received from additional end user computing device and fed additional test articles.

In block 414, a determination is made whether additional article requests or additional selections on the provided article are received from the first end user computing device. If the additional article requests (or selections on the provided article) are received from the first end user computing device, the requests from the first end user computing device 102a (or responses fed to the first end user computing device 102a) are tracked in block 418.

In block 416, a determination is made whether additional article requests or additional selections on the provided article are received from the second end user computing device. If the additional article requests (or selections on the provided article) are received from the second end user computing device, the requests from the second end user computing device 102a (or responses fed to the first end user computing device 102a) are tracked in block 420. In one implementation a user count corresponding to a number of user requests or responses, sample sizes, or a sampling rate is tracked.

In another implementation, one or more of the following responses are tracked: a time period a user selects a web page before selecting a different web page, a percentage or a number of users tracking scroll depth; a percentage or a number of users exiting or closing a web page, a percentage or a number of users exiting any web page provided to the user by the computing device; a percentage or a number of users requesting support personnel interaction via a case submit requests, chat request, emails request; phone call request or contact us request; a percentage or a number of users that enter information into a "search" for additional information field in the web page; what search terms users enter into the "search" for additional information field in the web page; a percentage or number of users that select other pages within a website provided by a legal entity; a percentage or a number of users that proceed to another support web page provided by the computing device; the support web page that is provided by the computing device; a percentage or a number of users that complete a survey or provide a comment response; a customer satisfaction indication; the time between the user selecting a first web page to the time the user selecting a link to subsequent web page on the first web page; or a percentage or a number of users that select a call to action link on the web page or select a link to a predetermined article indicated on the web page.

In block 422 the computing device 300 establishes and stores a rating for each of the tracked requests or responses. Each of the requests or responses may be rated as a positive behavior, a neutral behavior or a negative behavior depending on whether the request or response is a member of a set of a negative behavior category requests or responses, whether the request or response is a member of a set of a neutral behavior category requests or responses, or whether the request or response is a member of a set of a positive behavior category responses. What may be defined as a positive behavior, neutral behavior or negative behavior may be modified by the client using the client computing device depending on the situation. For example, sometimes the client might want an end user to spend a longer time on an article or select a particular link before scrolling.

Exemplary positive behaviors include at least one of: 1) the user selects a link to exit or close a particular web page, 2) the user selects a subsequent web page from a predetermined web page, 3) the user enters information on an additional web pages in accordance with the directions specified on the test article or control article, 4) the user posts a positive survey results on a predetermined web page, 5) the time between the user selecting a first web page to the time the user selecting a link to subsequent web page on the first web page is less than a predetermined length of time, or 6) the user scrolls through a web page a predetermined amount.

Exemplary negative behavior category responses include at least one of: 1) the user selecting a submitting an additional support case document, 2) the user selecting a "contact us" link on the web page, 3) the user contacting a customer service line, or 4) the user providing a poor rating indication or a negative comment to the computing device, 5) the user fails to enter information on an additional web pages in accordance with the directions specified on the test article or control article, 6) the time between the user selecting a first web page to the time the user selecting a link to subsequent web page on the first web page is greater than a predetermined length of time, or 7) the user scrolls through a web page a predetermined amount.

Referring to FIG. 5, in block 502, a determination is made whether a criterion is met or a time has expired to track the responses. If the criterion is not met, the computing device receives network article requests from end users in block 404. If the criterion is met or the time has expired to track responses, in block 504, a determination is made as to which article has a predetermined number of negative or positive responses.

If the number of positive or negative responses from the control article minus the number of positive or negative responses from the test article is more than a predetermined number, then the control article would not be replaced with the test article in block 506.

If the number of positive or negative responses from the control article minus the number of positive or negative responses from the test article is less than a predetermined number, then the control article would be replaced with the test article in block 508.

Figure 8:
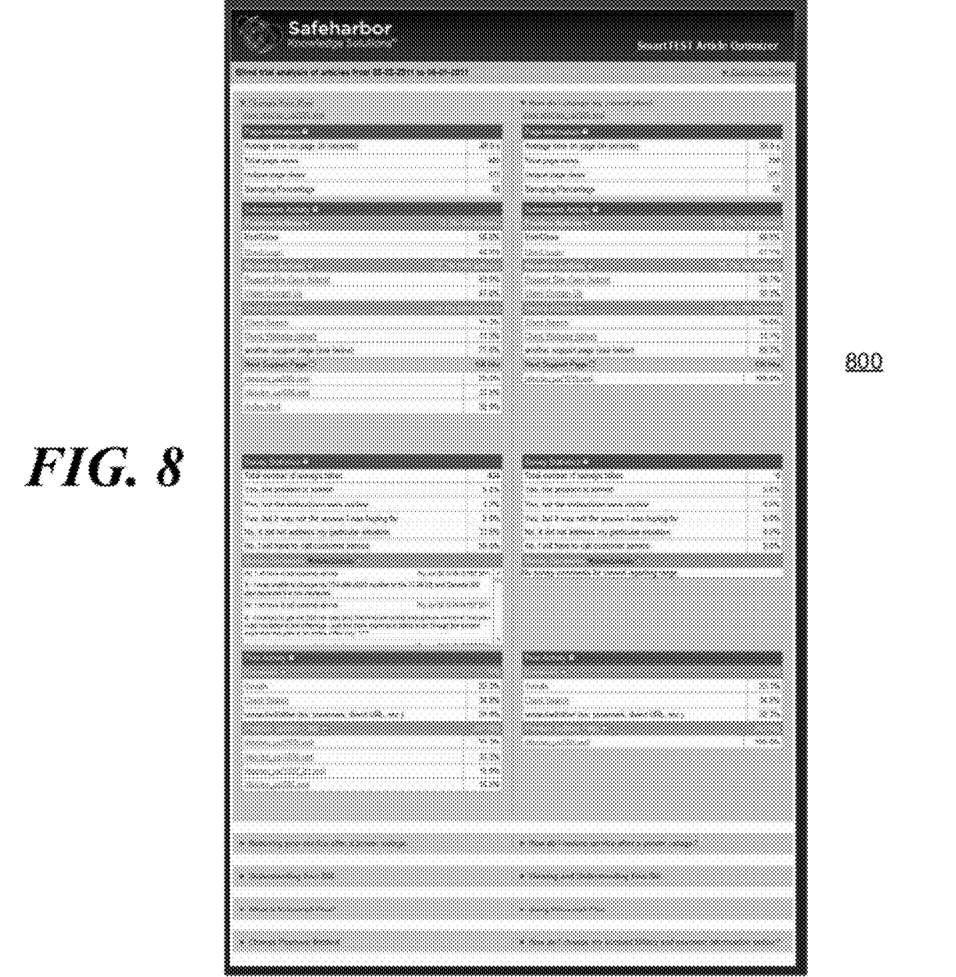
FIG. 8 is an exemplary display of the results of testing using a control and a test article as described herein.

The result of the testing could be provided to client computing device and displayed in block 506 in 508. An exemplary test result is shown as test result data 800 in FIG. 8.

In another implementation, the computing device 300 can provide a report on the tracking of the responses for further analysis. Such tracking can include providing a weighting of selections of items on the test article or control article by the end users. Changes can be made to the control article automatically or manually. Such changes can be made to the control article based on the results of various tracking various parameters, a combination of the weighted selections of the respective article, and selection of items by the end users on the test article. In one implementation, each positive and/or negative rating may then be weighted and combined to determine whether or not to replace the control article with the test article.

Examples of such tracking parameters include, but is not limited to, a time an end user spends between selections in the test or control article, the number of times one or more end user select an item in the test article or control article, a combination of negative and/or positive feedback provided by the end user, a percentage of end users that make a particular selection in a control article or test article, and a predetermined weighting applied to the particular selection on the test article.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A method for supporting a product or service with a computing device comprising:

receiving an article selection from a client indicating a selection of a control article and a test article stored in a memory of the computing device, the control article and the test article associated with one or more web pages to provide information via the network to support a product or service with the computing device;

receiving via the network article requests from multiple end users;

in response to a first of the article requests from a first end user of the multiple end users, feeding the control article via the network to the first end user, and in response to a second of the article requests from a second end user of the multiple end users, feeding the test article via the network to the second end user;

receiving one or more additional requests from the first end user resulting from the first end user being fed the control article, and receiving one or more additional requests from the second end user resulting from the second end user being fed the test article;

tracking the requests from or responses fed to the first end user;

tracking the requests from or responses fed to the second end user;

establishing a positive or a negative rating for each of the requests or responses;

determining whether the test article has a predetermined number of negative or positive requests or responses as compared with the requests or responses to the control article; and replacing the control article with the test article when the test article has the predetermined number of positive or negative requests or responses as compared with the requests or responses to the control article to increase efficiency in supporting the product or service with the computing device via the network.

2. The method as recited in claim 1, wherein establishing a rating for each of the requests or responses comprises:

rating each of the requests or responses as a positive behavior, a neutral behavior or a negative behavior depending on whether the request or response is a member of a set of a negative behavior category requests or responses, whether the request or response is a member of a set of a neutral behavior category requests or responses, or whether the request or response is a member of a set of a positive behavior category responses.

3. The method as recited in claim 1 further comprising:
setting an end time to track the requests and responses; and
replacing the control article with the test article when the test article has more positive or fewer negative requests or responses to increase efficiency in supporting the product or service with the computing device via the network after the end time.

4. The method as recited in claim 1 further comprising:
tracking one of 1) a user count corresponding to a number of user requests or responses, 2) a sample size, 3) a sampling rate; and setting a criteria to stop tracking the requests and replace the control article with the test article, the criteria being selected from one of a predetermined user count, a predetermined sample size a predetermined sampling rate or a predetermined time period.

5. The method as recited in claim 2, wherein the control article and test article is provided to the user via the one or more web pages stored in a memory of the computing device, and wherein the positive behavior category responses include at least one of the set of behavior category responses comprising: 1) the user selects a link to exit or close a particular web page, 2) the user selects a subsequent web page from a predetermined web page of the one or more web pages, 3) the user enters information on an additional web page of the one or more web pages in accordance with the directions specified on the test article or control article, 4) the user posts a positive survey results on a predetermined web page, 5) the time between the user selecting a first web page to the time the user selecting a link to subsequent web page on the first web page is less than a predetermined length of time, or 6) the user scrolls through the web page a predetermined amount.

6. The method as recited in claim 2, wherein the control article and test article is provided to the user via the one or more web pages stored in the memory of the computing device, and wherein the negative behavior category responses include at least one of the set of behavior category responses comprising: 1) the user selecting a submitting an additional support case document, 2) the user selecting a "contact us" link on the one or more web pages, 3) the user contacting a customer service line, or 4) the user providing a poor rating indication or a negative comment to the computing device, 5) the user fails to enter information on an additional web page in accordance with the directions specified on the test article or control article, 6) the time between the user selecting a first web page to the time the user selecting a link to subsequent web page on the first web page is greater than a predetermined length of time, or 7) the user scrolls through a web page a predetermined amount.

7. The method as recited in claim 1, wherein tracking the requests from or responses fed to the first end users, and tracking the requests from or responses fed to the second end users comprises tracking at least one of:
a time period a user selects a web page before selecting a different web page, a percentage or a number of users tracking scroll depth; a percentage or a number of users exiting or closing a web page, a percentage or a number of users exiting any web page provided to the user by the computing device; a percentage or a number of users requesting support personnel interaction via a case submit requests, chat request, emails request; phone call request or contact us request; a percentage or a number of users that enter information into a "search" for additional information field in the web page; what search terms users enter into the "search" for additional information field in the web page; a percentage or number of users that select other pages within a website provided by a legal entity; a percentage or a number of users that proceed to another support web page provided by the computing device; the support web page that is provided by the computing device; a percentage or a number of users that complete a survey or provide a comment response; a customer satisfaction indication; the time between the user selecting a first web page to the time the user selecting a link to subsequent web page on the first web page; or a percentage or a number of users that select a call to action link on the web page or select a link to a predetermined article indicated on the web page.

8. A computing device coupled with a network for supporting a product or a service, the computing device comprising:
a memory storing a control article and one or more test articles, the control article and the test articles being instantiated as web pages to support the product or the service, the control article being the primary article to support the product or the service;
a receiver to receive an article selection from a client indicating a selection of a control article and a test article;
a transmitter to feed the control article and the test article to multiple end users, the control article and the test article providing information to the multiple end users via the network to support a product or service with the computing device;
the receiver to receive via the network article requests from multiple end users;
the transmitter, in response to a first of the article request from a first user of the multiple end users, to feed the control article via the network to the first user, and in response to a second of the article requests from a second user of the multiple end users, to feed the test article via the network to the second user;
the receiver to receive one or more additional requests from the first user resulting from the first user being fed with the transmitter the control article, and to receive one or more additional requests from the second user resulting from the second user being fed with the transmitter the test article;
a tracking module to track the requests from or responses fed to the first end users, and to track the requests from or responses fed to the second end users; and
a control module to establish a rating for each of the requests or responses, and in response to the tracking of the requests or responses and in response to establishing a rating for each of these requests or responses, to provide an indication of whether the control article or test article has more negative or positive responses, the control module replacing the control article with the test article as the primary article to support the product or service if either certain test article positive responses less certain control article positive responses, or if certain test article negative responses less certain control article negative responses equals a predetermined number to increase efficiency in supporting the product or service with the computing device via the network.

9. The computing device as recited in claim 8, wherein the control module to establish for each of the requests or responses comprises:
a rating module to rate each of the requests or responses as a positive behavior, a neutral behavior or a negative behavior depending on a) whether the request or response is a member of a set of a negative behavior category requests or responses, b) whether the request or response is a member of a set of a neutral behavior category requests or responses, or c) whether the request or response is a member of a set of a positive behavior category responses.

10. The computing device as recited in claim 8, wherein the control module further comprises:
means for setting a start time and end time to track the requests and responses; and
means for replacing the control article with the test article if the test article has more positive or fewer negative responses to increase efficiency in supporting the product or service with the computing device via the network after the end time.

11. The computing device as recited in claim 8, wherein the tracking module further comprises:
    means for tracking one of 1) a user count corresponding to a number of user requests or responses, 2) a sample size, or 3) a sampling rate; and
    means for setting a criterion to stop tracking the requests and replace the control article with the test article, the criterion being selected from one of a predetermined user count, a predetermined sample size or a predetermined sampling rate.

12. The computing device as recited in claim 9, wherein the control article and test article is transmitted to the user as one or more web pages, wherein the web pages are stored in a memory of the computing device, and wherein the positive behavior category responses include at least one of the set of behavior category responses comprising: 1) the user exit or closing a web page, or 2) the user selecting a subsequent web page or entering information on an additional web page in according with the directions specified on the test article or control article via the one or more web pages.

13. The computing device as recited in claim 9, wherein the control article and test article is provided to the user as one or more web pages, wherein the web pages are stored in a memory of the computing device, and wherein the negative behavior category responses include at least one of the set of behavior category responses comprising: 1) the user selecting a submitting an additional support case document, 2) the user selecting a "contact us" link on the web page, 3) the user contacting a customer service line, or 4) the user providing a poor rating indication or a negative comment to the computing device.

14. The computing device as recited in claim 8, wherein tracking module tracks the requests from or responses fed to the first end users, and tracks the requests from or responses fed to the second end users comprises:
    tracking at least one of a time period a user selects a web page before selecting a different web page, a percentage or a number of users tracking scroll depth; a percentage or a number of users exiting or closing a web page, a percentage or a number of users exiting any web page provided to the user by the computing device; a percentage or a number of users requesting support personnel interaction via a case submit requests chat request, emails request; phone call request or contact us request; a percentage or a number of users that enter information into a "search" for additional information field in the web page; what search terms users enter into the "search" for additional information field in the web page; a percentage or number of users that select other pages within a website provided by a legal entity; a percentage or a number of users that proceed to another support web page provided by the computing device; the support web page that is provided by the computing device; a percentage or a number of users that complete a survey or provide a comment response; a customer satisfaction indication; or a percentage or a number of users that select a call to action link on the web page or select a link to a predetermined article indicated on the web page.

15. A non-transitory computer readable storage medium storing software, which when executed causes a processor of a computing device to perform functions comprising:
    receiving an article selection from a client indicating a selection of a control article and a test article stored in a memory of the computing device, the control article and the test article providing information via the network to support a product or service with the computing device;
    receiving, via the network, article requests from multiple end users;
    in response to a first of the article requests from a first user of the multiple end users, feeding the control article via the network to the first user, and in response to a second of the article requests from a second user of the multiple end users, feeding the test article via the network to the second user;
    receiving one or more additional requests from the first user resulting from the first user being fed the control article, and receiving one or more additional requests from the second user resulting from the second user being fed the test article;
    tracking the requests from or responses fed to the first end user;
    tracking the requests from or responses fed to the second end user;
    establishing a rating for each of the requests or responses;
    in response to the tracking of the requests or responses and in response to establishing a rating for each of these requests or responses, providing an indication of whether the control article or test article has more negative or positive responses; and
    replacing the control article with the test article if the test article has more positive or fewer negative requests or responses to increase efficiency in supporting the product or service with the computing device via the network.

16. The computer readable storage medium storing software as recited in claim 15, the software which when executed causes a processor of the computing device to perform functions establishing a rating for each of the requests or responses comprises:
    rating each of the requests or responses as a positive behavior, a neutral behavior or a negative behavior depending on whether the request or response is a member of a set of a negative behavior category requests or responses, whether the request or response is a member of a set of a neutral behavior category requests or responses, or whether the request or response is a member of a set of a positive behavior category responses.

17. The computer readable storage medium storing software as recited in claim 15, the software which when executed causes a processor of the computing device to perform functions further comprising:
    setting a start time and end time to track the requests and responses; and
    replacing the control article with the test article if the test article has more positive or fewer negative responses to increase efficiency in supporting the product or service with the computing device via the network after the end time.

18. The computer readable storage medium storing software as recited in claim 15, the software which when executed causes a processor of the computing device to perform functions further comprising:
    tracking one of 1) a user count corresponding to a number of user requests or responses, 2) a sample size, 3) a sampling rate; and
    setting a criteria to stop tracking the requests and replace the control article with the test article, the criteria being selected from one of a predetermined user count, a predetermined sample size or a predetermined sampling rate.

19. The computer readable storage medium storing software as recited in claim 16, wherein the software which when executed causes a processor of the computing device to perform functions of providing the control article and test article to the user as one or more web pages stored in a memory of the computing device; and wherein the positive behavior category responses include at least one of the set of behavior category responses comprising: 1) the user exit or closing a web page, or 2) the user selecting a subsequent web page or entering information on an additional web page in according with the directions specified on the test article or control article via the one or more web pages.

20. The computer readable storage medium storing software as recited in claim 16, wherein the software which when executed causes a processor of the computing device to provide the control article and test article to the user as one or more web pages stored in a memory of the computing device; and wherein the negative behavior category responses include at least one of the set of behavior category responses comprising: 1) the user selecting a submitting an additional support case document, 2) the user selecting a "contact us" link on the web page, 3) the user contacting a customer service line, or 4) the user providing a poor rating indication or a negative comment to the computing device.

* * * * *